(No Model.)
W. H. JACOBY.
COAT HOOK.
No. 378,201.　　　　　　　　　Patented Feb. 21, 1888.
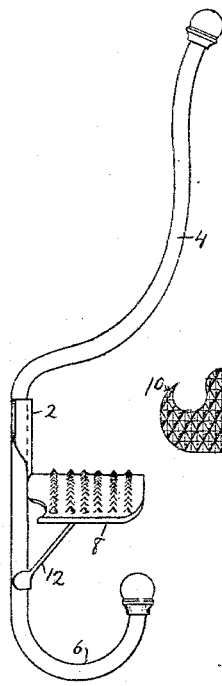
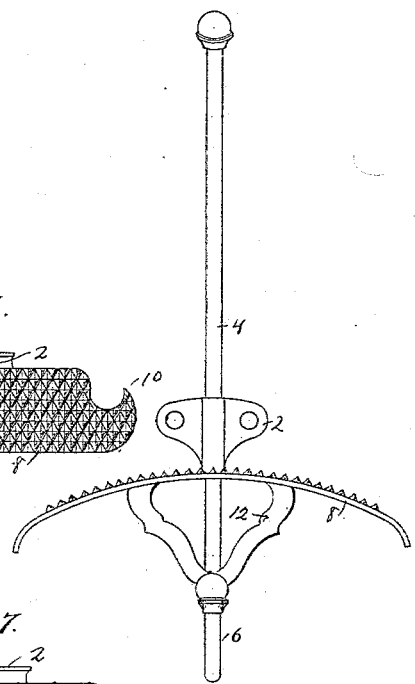
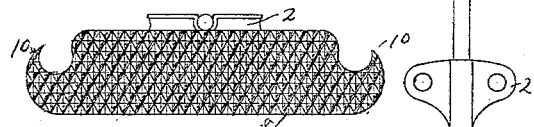
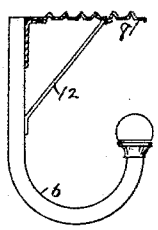
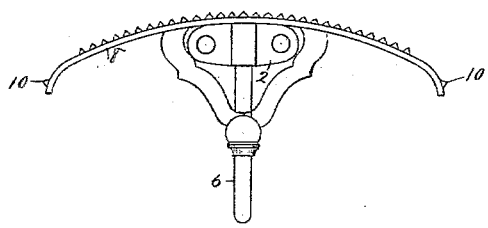
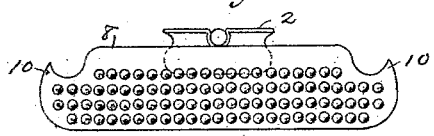
Witnesses
S. J. Beardslee.
J. Jessen.
Inventor,
William H. Jacoby.
By Paul Sanford & Merwin Att'ys

UNITED STATES PATENT OFFICE.

WILLIAM H. JACOBY, OF MINNEAPOLIS, MINNESOTA.

COAT-HOOK.

SPECIFICATION forming part of Letters Patent No. 378,201, dated February 21, 1888.

Application filed November 8, 1887. Serial No. 254,612. (No model.)

*To all whom it may concern:*

Be it known that I, WILLIAM H. JACOBY, of Minneapolis, in the county of Hennepin and State of Minnesota, have invented certain new and useful Improvements in Coat-Hooks, of which the following is a specification.

My invention relates to improvements in hooks for supporting coats and other garments; and the object I have in view is to provide a hook of this class with a broad supporting-surface to support the collar of the garment and prevent it from being punctured or stretched out of shape, as is the case when the ordinary hook is used.

My invention consists in the construction of the supporting-plate, whereby I am enabled to support the collar of the coat for a considerable part of its length without altering its shape, and also prevent it from being accidentally detached from said plate.

Other features of my invention will appear from the following detailed description.

In the drawings which form a part of this specification, Figure 1 is a side elevation of my improved hook. Fig. 2 is a front elevation of the same. Fig. 3 is a partial section showing a modification when a single hook is used. Fig. 4 is a front elevation of Fig. 3. Figs. 5, 6, and 7 are plan views of the supporting-plate.

In the drawings, 2 represents a flange or screw-plate by which the hook is held in position. The upper portion, 4, of the hook is preferably bent outward, as shown in Fig. 1, and made of sufficient length to allow it to be used for a hat-hook. It may be formed of wire or cast in any ornamental shape. The lower portion, 6, is also preferably bent outward to form another smaller hook for hanging such garments as are not liable to injury by being pressed out of shape by the end of the hook. I do not, however, confine myself to the use of these hooks, as one or both may be dispensed with without departing from the main features of my invention.

A curved plate, 8, is secured to the screw-plate 2, either above or below it, as may be most convenient, and forms the supporting-plate for the collar of the coat. The upper surface of this plate is preferably roughened to prevent the coat from slipping off. This may be done in various ways. The surface may be embossed, as shown in Figs. 2 and 5, by raising a series of cone-shaped projections upon the surface; or it may have a series of corrugations running lengthwise of the plate, or by raising a series of diamond-shaped points upon the surface, as shown in Fig. 6; or, if preferred, the plate may be formed of a net-work of wire, as shown in Fig. 7, in which case the fabric of the coat will be pressed between the wires sufficiently to hold it in place. The curve given in this plate is for the purpose of fitting the natural shape of the collar, so that when the coat is placed over it or hung upon it no undue strain will be brought upon any portion and cause it to be drawn out of shape. For this purpose the outer ends are rounded downward in such a manner that no sharp angles will be formed, no matter how long a time the coat may be suspended.

I prefer to provide the plate with inwardly-projecting pointed corners 10, preferably formed upon the plate by cutting out a portion of the plate at each of the back corners, for the purpose of preventing the coat from being accidentally thrown off the plate. These corners may be formed by cutting a curved recess in this portion of the plate, as shown in Figs. 5 and 6. The portion of the plate which is left by the recess will then form a point which will be at or near the two back corners. Substantially the same effect may be obtained by placing a projecting point or boss upon the lower end of the plate, which will engage the coat, as hereinafter described. The action of this is that if the coat should be moved either to the right or left the upper portion of the collar will be pressed downward and back of one or both of these corners or projections, and will be held in its position upon the supporting-plate; but these corners will offer no resistance if the coat is lifted from the plate for the purpose of removing it.

One or more braces, 12, may be attached to the outer edge of the plate and secured to the hook 6 when this hook is used, or to the screw-plate when the hook is dispensed with. This brace acts as a support to the plate to carry the weight brought upon the outer portion of the said plate.

I am aware that it has been proposed to use a smooth curved plate as a coat-support and to attach such plate to a hook; but in order to hang a coat upon the support of this kind it is necessary to carry it over so that the collar will bear down upon the back side of the plate, or otherwise the coat will slip off the plate. With my device the collar alone rests upon the plate. The roughened or corrugated surface prevents the coat from slipping off the hook, and, as the collar of the coat is usually of double thickness, the coat, when hung upon my support, is not injured and does not lose its shape.

I claim as my invention—

1. In a coat-hook, the combination of the curved supporting-plate 8, having the roughened or uneven upper surface, and the screw-plate 2, secured to the said supporting-plate, in the manner and for the purpose substantially as described.

2. A coat-hook provided with the curved supporting-plate 8, having the roughened or uneven surface, and having the pointed hooks 10 at or near the back corners of said plate.

3. A coat-hook of the class described, provided with the curved plate 8, having the roughened or uneven upper surface, substantially as described.

4. In a coat-hook, the combination of the curved supporting-plate 8, having the roughened or uneven upper surface, the screw-plate 2, and the projecting hook 6, all substantially as described.

5. The coat and hat hook comprising the curved plate 8, provided with a roughened or uneven upper surface, the projecting upper hook, 4, the lower hook, 6, and the screw-plate 2, all arranged substantially as described.

In testimony whereof I have hereunto set my hand this 4th day of November, 1887.

WILLIAM H. JACOBY.

In presence of—
T. D. MERWIN,
R. H. SANFORD.